C. H. EVANS.
SWEET POTATO SIZING MACHINE.
APPLICATION FILED NOV. 21, 1921.

1,403,597.

Patented Jan. 17, 1922.
2 SHEETS—SHEET 1.

Inventor,
Charles H. Evans.

By Donald L. Matson.
Attorney

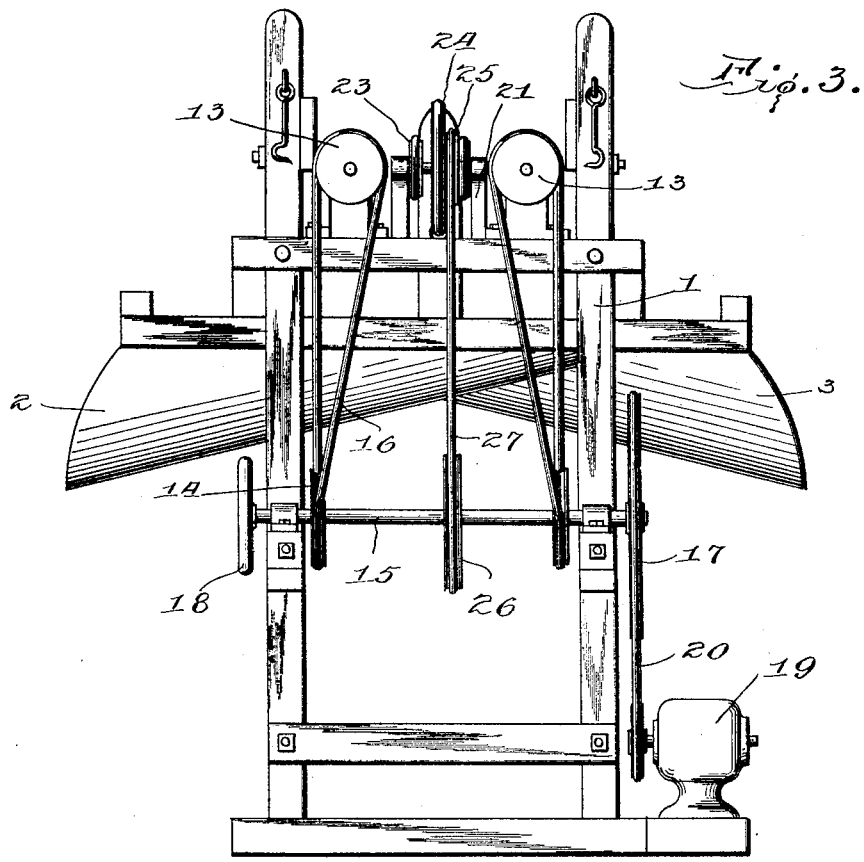
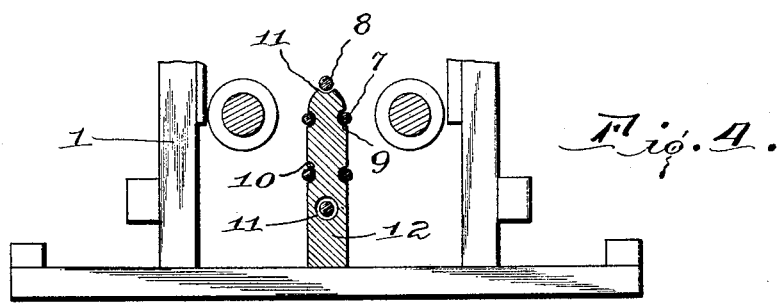

UNITED STATES PATENT OFFICE.

CHARLES H. EVANS, OF NEWFANE, NEW YORK.

SWEET-POTATO-SIZING MACHINE.

1,403,597.   Specification of Letters Patent.   Patented Jan. 17, 1922.

Application filed November 21, 1921. Serial No. 516,612.

*To all whom it may concern:*

Be it known that CHARLES H. EVANS, a citizen of the United States, residing at Newfane, in the county of Niagara and State of New York, has invented certain new and useful Improvements in Sweet-Potato-Sizing Machines, of which the following is a specification.

This invention relates to fruit sizing machines, more particularly to machines for sizing or assorting out sweet potatoes and other elongated fruits and vegetables.

An object of the invention is to provide a suitable fruit sizing machine which will have means for carrying the fruit to be sorted from the inlet end towards the outlet end, and also means for straightening out the elongated fruit so that it may readily pass between the sorting rollers and the feed belts.

Another object of the invention is to provide a suitable fruit sizing machine which will be so constructed as to give maximum efficiency with a minimum cost of production.

A still further object of the invention is to provide a simple and inexpensive fruit sizing machine which will be thoroughly practical and will effect the sizing or grading of any kinds of fruit without danger of bruising or crushing, even though the said fruit be ripe.

Other objects will appear as the description proceeds.

The accompanying drawings, forming a part of this specification and in which like numerals of reference indicate corresponding parts, illustrate one form of embodiment of the invention capable of carrying the same into practical operation, it being understood that the elements therein exhibited may be varied or changed as to shape, proportion, and exact manner of assemblage without departing from the spirit of the invention.

In the drawings,

Figure 3 is an end elevation of the machine, taken from the feed end thereof, and Figure 4 is a transverse sectional view taken on the lines 4—4 of Figure 1 and looking in the direction of the arrows thereon.

Figure 1:
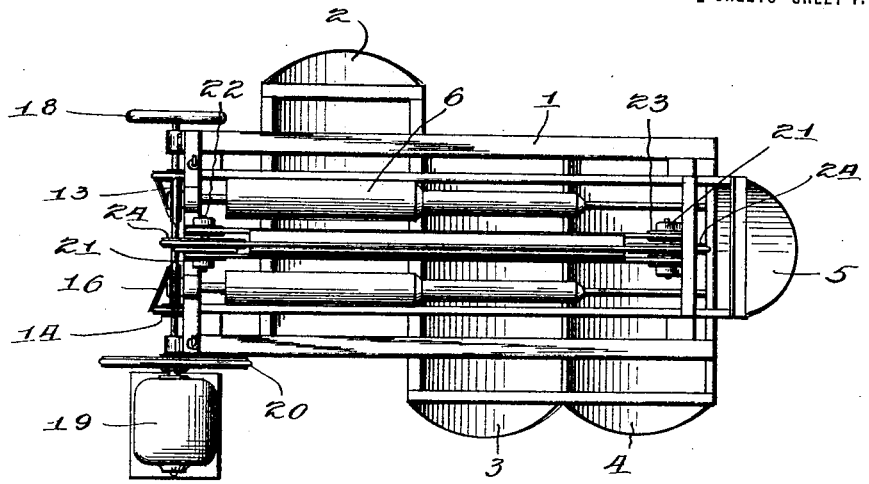
Figure 1 is a plan view of my improved fruit sizing machine.
Figure 2:
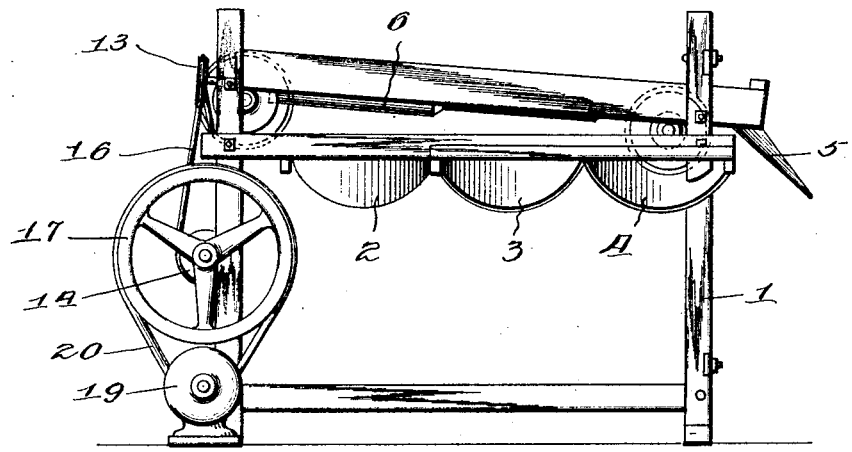
Figure 2 is a side elevation of the same.

Referring to the drawings, the supporting frame 1 of the machine is provided with a plurality of fruit discharging chutes 2, 3, 4 and 5, although there may be as many as necessary and of any desired construction. The frame 1 of the machine is to have the usual fruit receiving tray or picking table associated with it but this is omitted in the drawings so that the operating mechanism may best be shown unobstructed.

My invention resides in the fruit sizing or sorting mechanism, which comprises two or more sorting rollers 6 and the fruit feeding belts 7 and 8. The rollers 6 are supported in an inclined position as usual and are formed in sections of successively decreasing diameters toward their discharge ends and are preferably made of a solid bar of steel, the shoulders formed at the meeting points of the sections being preferably beveled or rounded as at 9, to prevent injury to the fruit in its passage through the machine.

One of the most important features of my invention is the feeding belts 7 and 8, which are circular in cross section and are made of some yielding material such as rubber, and are partly housed in the pairs of aligned grooves or ways 9, 10 and 11 formed on opposite sides of the partition 12 and along the upper surface thereof. These feeding belts are arranged midway of the sorting rollers 6. These sorting rollers 6 are spaced equidistant from the feed belts 7 and rotate in an outward direction. The feeding belts are normally free from engagement with the walls of the ways 9 and 10, thereby to permit them to have a limited lateral movement to yield to the weight of the fruit and to prevent crushing the same against the sorting rollers. Each of the sorting rollers carries at its feed end a sheave 13 which is connected with the sheaves 14 on the shaft 15 by means of the belts 16. Fixed at one end of the shaft 15 is a driving pulley 17 and at its opposite end the balance wheel 18. Mounted on the frame work 1 is a motor 19 connected with the pulley 17 by means of the belt 20. Thus it will be seen that the motor when operated will cause the sorting rollers 6 to rotate in an upward and outward direction.

Brackets 21 at opposite ends of the frame work have mounted therein a transverse shaft 22 which carry the sheaves 23 of like diameter, the sheaves 24 of much larger diameter and the driving sheave 25, which is connected to the pulley or sheave 26 by means of the belt 27. The sheaves 23, 24 and 25 are all fixed to the shaft 22, so that when one moves all will move simultaneously. Since the sheaves 23 are of the same size, the belts 7 carried thereby move at the same speed. The sheaves 24 carrying the belt 8, which is positioned above the belt 7, travels at a much faster rate of speed since the sheaves 24 are of larger diameter than the sheaves 23. Therefore, it will be seen that with the belts 7 and 8 running in the same direction, and the belt 8 running at a faster rate of speed, should a sweet potato or yam be lodged crosswise of the belts, the added speed of the belt 8 would cause it to straighten out and pass toward the discharge end of the machine, until it dropped into the proper chute.

The operation of the machine is as follows:

The motor 19 operating the drive shaft 15 to which are connected the sheaves 14 and 26 cause the two sorting rollers and the belts 7 and 9 to function. The sorting rollers are turning upward and outward, while at the same time a longitudinal movement is imparted to the feeding belts, and under this construction it will be seen that the fruit that lodges between the sections of the sorting rollers and the feeding belts will be constantly moved upward and at the same time onward, thereby obviating any possibility of the fruit becoming choked or clogged between the rollers and the belts.

This machine is adapted for sorting any kind or size of fruit, but is especially adapted for sorting sweet potatoes, yams and other elongated fruits and vegetables. It will be seen that every surface with which a fruit contacts is rounded so that mashing or bruising of the fruit will be impossible.

Fruit being fed down the picker table to the sorting rollers has longitudinal onward movement imparted thereto by the feeding belts and at the same time a rotary or worm motion due to the rotation of the sorting rollers, which will prevent the machine from becoming clogged, so that the fruit will always be fed onward towards the discharge, the smaller fruit escaping to the chute 2, the next larger to the chute 3 and so on, the largest of the fruit escaping from the chute 5. By providing two feeding belts, either side of the machine can be used or both sides, as may be deemed desirable.

It will be understood that the main feature of my invention is the provision of the more rapidly moving belt 8, positioned adjacent to and above the belt 7 to straighten out the fruit that becomes lodged crosswise of the machine.

Having thus described my invention, what I claim as new and desire to secure by means of Letters Patent of the United States, is:

1. A fruit sizing machine comprising a longitudinally disposed sorting roller constructed in sections of successively decreasing diameter toward their discharged ends, the shoulders formed at the meeting points of the sections being beveled, in combination with a feeding belt disposed parallel to the axis of the roller, said feeding belt being circular in cross section and capable of a limited movement laterally in an outward direction from the sorting roller, a second feed belt adjacent said first feed belt and disposed above the same, said last mentioned belt being geared to travel faster than said first mentioned belt, and means for rotating the sorting roller in an upward and outward direction from the upper lead of the feed belt and for operating the upper lead of the latter in the direction of the discharge end of the roller.

2. A machine of the class described, a pair of longitudinally disposed sorting rollers constructed in sections of successively decreasing diameter toward their discharge ends, the shoulders formed at the meeting points of the sections being beveled, a partition being disposed between said sorting rollers and provided with a groove or recess along its upper edge and with recesses in the sides thereof, longitudinally disposed feed belts parallel to the axis of the sorting rollers, said feed belt being of yieldable material, circular in cross section and partly housed in the recesses in the sides and top of the central partition, but at a distance from the faces of said recesses which shall permit of a limited expansion of the feed belts in an outward direction from the sorting rollers, supporting means for said sorting rollers and feed belts, and means for operating the same.

3. A machine of the class described, a frame, a pair of longitudinally disposed sorting rollers, constructed in sections of successively decreasing diameter towards their discharge ends, the shoulders formed at the meeting points of the sections being beveled, a partition disposed between said sorting rollers and provided with a groove or recess along its upper edge and with recesses in the sides thereof, longitudinally disposed feed belts parallel to the axis of the sorting rollers, a belt adapted to move more rapidly positioned between said longitudinally disposed feed belts and moving in the same direction, said feed belts being of yieldable material, circular in cross section and partly housed in the recesses in the sides of the central partition, but at a distance from the faces of said recessses, which shall permit of a limited expansion of the feed belts in an outward direction from the sorting rollers and means for simultaneously operating said rollers and belts.

In testimony whereof I affix my signature.

CHARLES H. EVANS.